Oct. 30, 1962     W. B. WHETSTONE     3,061,394
DESK FOR MOTOR VEHICLES
Filed March 10, 1961

INVENTOR.
William B. Whetstone
BY *Lowery & Rinehart*
*attys.*

United States Patent Office 3,061,394
Patented Oct. 30, 1962

3,061,394
DESK FOR MOTOR VEHICLES
William B. Whetstone, 13171 Herron St., Sylmar, Calif.
Filed Mar. 10, 1961, Ser. No. 94,829
2 Claims. (Cl. 312—256)

This invention relates in general to new and useful improvements in office appliance construction, and more particularly to a novel desk particularly adapted for mounting in automobiles and other motor vehicles.

Salesmen and other businessmen who travel frequently by automobile, together with other frequent operators of motor vehicles in the course of business, such as truck drivers, have a great need for means for readily transporting their records and keeping accounts. It is therefore the primary object of this invention to provide a novel desk which may be readily mounted in motor vehicles of various types and which has means for the storage of records, catalogues, report sheets, forms, file cards and the like, as well as means providing a convenient writing surface for the purpose of writing, etc., while in the motor vehicle.

Another object of this invention is to provide a novel desk for mounting in a motor vehicle, the desk including an upright section and a generally horizontal section, the horizontal section being intended to be seated on a motor vehicle seat and the upright section having supporting legs which are individually adjustable and are engageable with a vehicle floor.

Another object of this invention is to provide a novel desk for mounting in a motor vehicle, the desk being of a light weight, yet rigid construction, whereby the desk may be readily placed within and removed from a vehicle without damage.

Still another object of this invention is to provide a novel desk construction which is primarily formed of two containers suitable for the storage of records, each of the containers having an upper cover member to facilitate access to the interior thereof, the containers being rigidly secured together with one of the containers being upright and partially forming a support for the other, and the other container being generally horizontally disposed for being seated on a vehicle seat, and the cover member for the horizontally disposed container forming a writing surface.

A further object of this invention is to provide a novel supporting leg structure for a writing desk primarily intended to be mounted within a vehicle and the supporting legs thereof being intended to rest upon the floor of the vehicle, the leg construction including an angle member disposed at a corner of an upright cabinet-like container and the angle member being secured along the edges only thereof to the container with the remainder thereof spaced from the container and defining an annular leg receiving space, and a vertically adjustable leg of an angle cross-section received within the space between the angle member and the container to be guided in its vertical movement, and the container having means for clamping the leg in its vertically adjusted position.

A still further object of this invention is to provide a novel writing desk for mounting within a vehicle, the writing desk including an upright compartment intended to be supported on the floor of the vehicle, and a generally horizontal compartment which is rigidly secured to the upper portion of the upright compartment and is intended to be supported on the seat of a vehicle, the two compartments being provided with top covers which are hingedly mounted and which are so connected to the compartments whereby they swing forwardly to permit access to the interiors of the compartments by a person seated on the seat alongside the desk.

With the above, and other objects in view that will hereinafter appear, the nature of the invention will be more clearly understood by reference to the following detailed description, the appended claims and the several views illustrated in the accompanying drawing:

Figure 1:
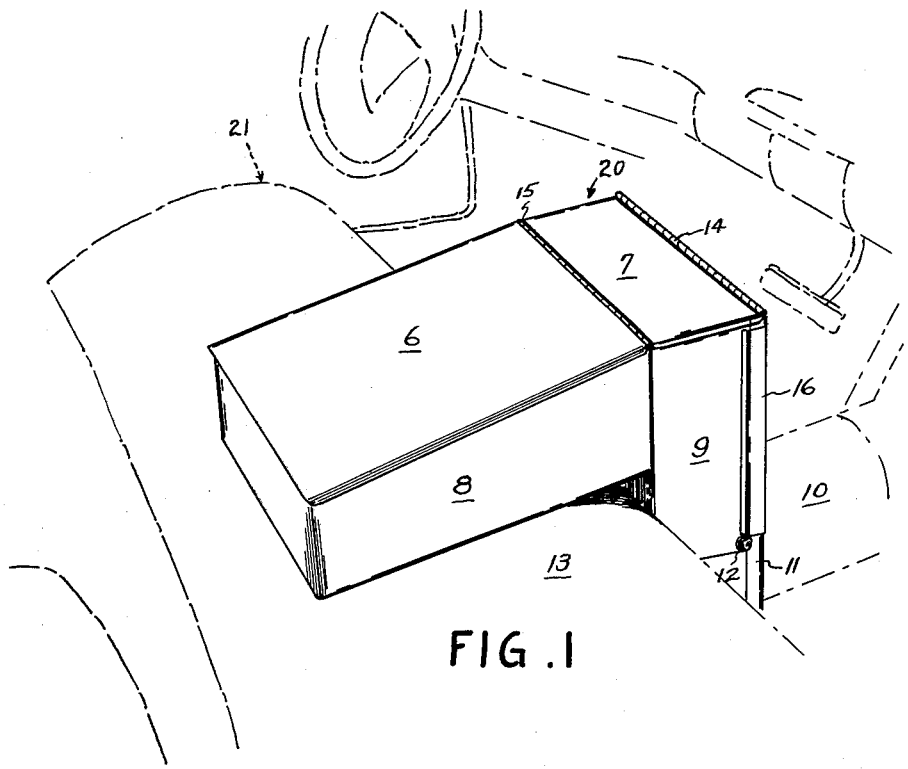
FIGURE 1 is a perspective view of the writing desk which is the subject of this invention, and shows the same mounted in a front seat of a conventional type of automobile alongside the operator portion of the seat, the various portions of the automobile being shown in phantom lines.

Reference is now made to the drawing in detail, wherein there is illustrated the writing desk which is the subject of this invention, the writing desk being generally referred to by the numeral 20. The writing desk is illustrated as being mounted within the front seat portion of a conventional type of automobile which is generally referred to by the numeral 21.

The writing desk 20 includes a generally upright compartment 9 and a generally horizontal compartment 8 which are rigidly secured together. Each of the compartments 8 and 9 are formed of suitable gauge sheet metal and are of a rigid construction. It is to be noted that the forward end of the compartment 8 is disposed in face-to-face engagement with the upper rear surface of the compartment 9, and the two are rigidly secured together substantially at right angles to each other.

Figure 3:
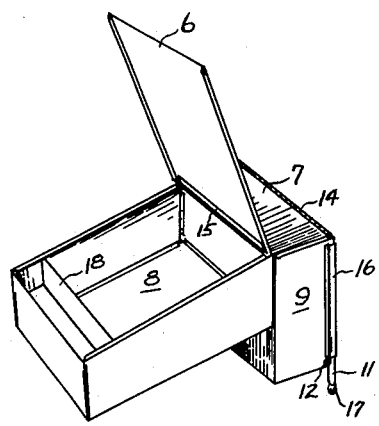
FIGURE 3 is a perspective view on a reduced scale similar to FIGURE 2, but shows the top cover of the generally horizontal compartment in an open position giving access to the interior of the generally horizontal compartment.

The compartment 8 is provided with a top cover 6 which is hingedly connected to the remainder of the compartment 8 by a piano type hinge 15. It is to be noted that the hinge 15 is disposed along the forward upper edge of the compartment 8 so that the top cover 6 thereof may swing upwardly and forwardly to a position providing access to the interior of the compartment 8, as is best shown in FIGURE 3. This manner of hinging the top cover 6 permits the top cover 6 to be moved to its position of FIGURE 3 by a person seated on the front seat 13 of the vehicle 21 on which the generally horizontal compartment 8 rests, without interference to another person who may be sitting on the front seat 13 on the opposite side of the writing desk 20. It is to be noted that the top cover 6 slopes downwardly and rearwardly so as to provide a convenient writing surface.

Figure 2:
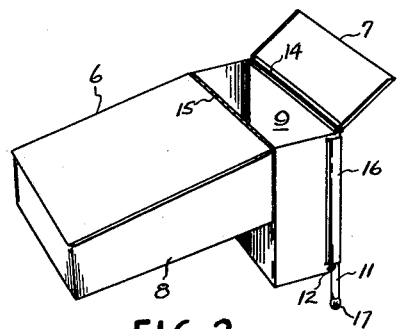
FIGURE 2 is a perspective view on a reduced scale of the writing desk of FIGURE 1 and shows the same removed from the automobile and with the top cover of the upright compartment thereof in an open position for access to the interior of the upright compartment.

The upper end of the compartment 9 is normally closed by a top cover 7 which is hingedly mounted by means of a piano type hinge 14. It is to be noted that the hinge 14 is also disposed along the forward edge of the compartment 9 at the upper end thereof so that when the top cover 7 is swung to a position providing access to the interior of the compartment 9, as is shown in FIGURE 2, the top cover 7 does not interfere with persons seated alongside the writing desk 20.

The compartments 8 and 9 are preferably formed of light weight cold rolled sheet steel in the same manner as are other types of metal containers or metal office furniture. Since the specific details of construction of these compartments is not critical except that they should be light in weight and at the same time very strong, the specific details of the compartments 8 and 9 will not be disclosed here. However, it is pointed out that the compartment 8 is provided with a tray 18 for holding pencils and other loose supplies, and that suitable dividers (not shown) may be provided in either the compartment 8 or 9 depending on the type of records, maps, etc., which are to be stored therein.

As is clearly illustrated in the drawings, the writing desk 20 is intended to be mounted within a vehicle with the compartment 9 disposed in an upright position and the compartment 8 in a generaly horizontal position resting upon the vehicle seat 13. In order that the writing desk 20 may be mounted in various types of vehicles without changes in construction, the upright compartment 9 is not of a sufficient height so that the lower edge thereof will rest on any part of the floor of the vehicle. In order to provide for the supporting of the upright compartment 9, there is provided a pair of upright legs 11, the legs 11 being disposed at the forward corners of the compartment 9.

Figures 4, 5:
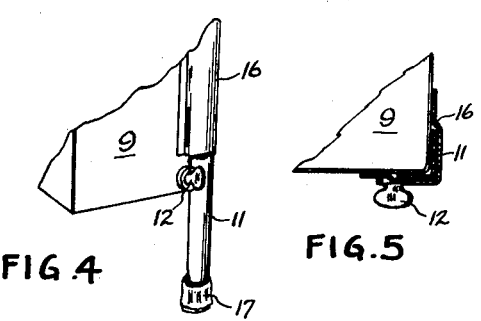
FIGURE 4 is an enlarged fargmentary perspective view of the lower portion of the upright compartment and shows the specific mounting of the adjustable supporting leg disposed at a corner of the upright compartment.
FIGURE 5 is a horizontal sectional view through the leg construction, and shows the manner in which the leg is adjustably mounted on the upright compartment, the compartment being shown in plan for purposes of clarity.

In order that the writing desk 20 may be mounted in various types of cars, the legs 11 are mounted for vertical adjustment. In order to accomplish this, at each of the forward corners of the compartment 9, there is disposed an angle member 16 which, as is best illustrated in FIGURE 5, is secured to the compartment 9 along the edges of the angle member 16, with the angle member 16 being otherwise spaced from the compartment 9 to provide suitable space for the upper portion of the associated leg 11. In this manner, the leg 11 is mounted for vertical sliding movement with respect to the compartment 9, and at the same time, is prevented from twisting with respect to the compartment 9 to thereby provide the necessary lateral support. In order that each leg 11 may be supported in a vertically adjusted position, there is carried by an associated side of the compartment 9 a clamping screw 12 which will clamp against one flange of the leg 11 in the manner best illustrated in FIGURES 4 and 5. When it is desired to mount the writing desk 20 within the vehicle 21, the generally horizontal compartment 8 is seated on the seat 13 and while the writing desk 20 is supported, the legs 11 are extended until they engage the floor of the vehicle 21. When the legs 11 have been properly adjusted, the clamping screws 12 are tightened down to clamp the legs 11 in their adjusted positions. It is to be noted that the lower ends of the legs 11 are provided with feet 17 which are in the form of rubber feet, preferably of the type used on the ends of metal chairs, crutches, etc. In this manner, skidding of the writing desk 20 with respect to the vehicle 21 is prevented.

A large number of the vehicles are provided with tunnels 10 in the floors thereof. It will be readily apparent that by providing separate legs 11 which are independently vertically adjustable, the writing desk 20 may be positioned within any type of vehicle in any desired transverse position with the legs 11 either straddling the tunnel 10 or one of the legs resting upon the tunnel 10.

Although the desk 20 has been illustrated in FIGURE 1 as being mounted on the front seat of the vehicle 21, it is to be understood that the invention is not so limited and that it could equally as well be mounted on the rear seat of the vehicle. It is also pointed out at this time that the desk 20, while it is of an extremely rigid construction, is sufficiently light in weight so as to be readily removable from the vehicle whenever it is desired.

From the foregoing, it will be seen that novel and advantageous provision has been made for carrying out the desired end. However, attention is directed to the fact that variations may be made in the example writing desk disclosed herein without departing from the spirit and scope of this invention, as defined in the appended claims.

I claim:
1. A desk for mounting in a vehicle, said desk comprising an upright compartment and a generally horizontal compartment rigidly secured together to form a unit, said upright compartment having vehicle floor engaging means and said generally horizontal compartment being adapted to rest on a vehicle seat and being of a length to present the rear vertical wall of the upright compartment adjacent the forward edge of the vehicle seat, said vehicle floor engaging means being in the form of angle guide members disposed at the forward corners of said upright compartment, said angle guide members having edge portions secured to said upright compartment and being otherwise spaced from said upright compartment, an upright leg slidable in the space between each angle member and said upright compartment for vertical adjustment, and means for holding each upright leg in an adjusted position.

2. The desk of claim 1 wherein each upright leg is of an angle cross-section and said holding means is in the form of a clamp carried by said upright compartment and engaging with a flange of said upright leg.

References Cited in the file of this patent
UNITED STATES PATENTS

| | | |
|---|---|---|
| 2,460,712 | Peterson | Feb. 1, 1949 |
| 2,524,909 | Hines | Oct. 10, 1950 |
| 2,588,405 | Munger | Mar. 11, 1952 |
| 2,673,595 | Kump | Mar. 30, 1954 |
| 2,740,466 | Du Priest | Apr. 3, 1956 |